United States Patent [19]

Buma et al.

[11] Patent Number: 5,039,125
[45] Date of Patent: Aug. 13, 1991

[54] AIR BAG DEVICE

[75] Inventors: Kozi Buma; Shinji Mori; Takashi Ogasawara; Hiroaki Shinto, all of Aichi, Japan

[73] Assignee: Kabushiki Kaisha Tokai-Rika-Denki-Seisakusho, Aichi, Japan

[21] Appl. No.: 562,257

[22] Filed: Aug. 3, 1990

[30] Foreign Application Priority Data

Aug. 9, 1989 [JP] Japan .................................. 1-93522

[51] Int. Cl.5 ............................................ B60R 21/32
[52] U.S. Cl. .................................. 280/734; 180/282; 280/731
[58] Field of Search ............... 280/728, 731, 734, 735; 180/282

[56] References Cited

U.S. PATENT DOCUMENTS 4,573,706 3/1986 Breed ............................... 280/734

FOREIGN PATENT DOCUMENTS 60-248454 12/1985 Japan .
60-248455 12/1985 Japan .
60-248456 12/1985 Japan .
60-248457 12/1985 Japan .

Primary Examiner—Kenneth R. Rice
Attorney, Agent, or Firm—Sixbey, Friedman, Leedom & Ferguson

[57] ABSTRACT

An air bag device in which an internal acceleration sensor is prevented from operating a main body of an air bag device is mounted on a vehicle. The device is provided with a stopper for interlinking a fixing bolt for mounting the main body of the air bag device on the vehicle with a canceling screw for canceling the state of preventing the actuation of the acceleration sensor. Before the main body of the air bag device is threadingly inserted into the vehicle by means of the fixing screw and is thereby secure, the stopper keeps the canceling screw from being threadingly inserted.

20 Claims, 9 Drawing Sheets

(PRIOR ART)

AIR BAG DEVICE

BACKGROUND OF THE INVENTION

1. Field of the Invention

The present invention relates to an air bag device for protecting an occupant of a vehicle as an air bag is inflated in front of the occupant at the time of the action of an acceleration.

2. Background Information

In recent years, air bag devices have been proposed for protecting a seat occupant of a vehicle as an air bag is inflated in front of the occupant when the vehicle speed has been suddenly decelerated (Japanese Patent Application Laid-Open Nos. 60-248454, 60-248455, 60-248456, and 60-248457).

An air bag device of this type is so arranged that a lock bar, prevents the movement of a ball so that the air bag will not be inflated even if an impact has been applied to a main body of the air bag device before installation of the air bag device on a steering wheel.

The main body of the air bag device is fixed to the steering wheel by means of fixing bolts. After the main body of the air bag device is fixed, a sliding member for moving a release pin is inserted into the main body of the air bag device so as to move the release pin upwardly, which in turn moves the lock bar, thereby rendering the ball movable.

Figure 9:
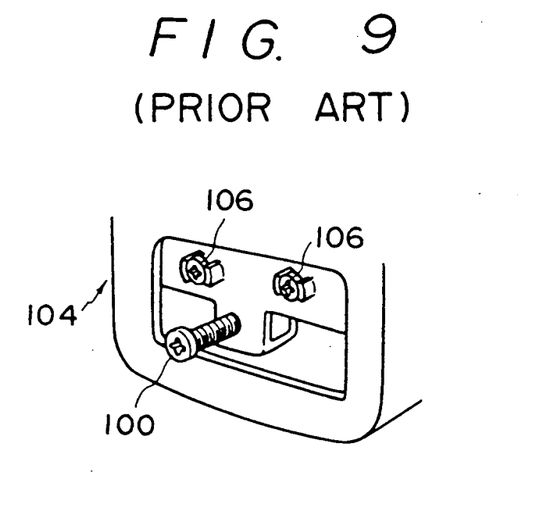
FIG. 9 is a perspective view of a mounting portion of a conventional air bag device.

As shown in FIG. 9, fixing bolts 106 for fixing the main body of the air bag device to a steering wheel 104 are also present in the vicinity of an elongated bolt 100 connected to an unillustrated slider.

For this reason, if the operator threadingly inserts the elongated bolt 100 first by mistake, the slider connected to the elongated bolt 100 moves, which in turn causes the release pin to move the lock bar, thereby canceling the prevention of the movement of the ball. For this reason, if an impact is applied to the main body of the air bag device during the operation of the installation of the main body, there is the possibility of the air bag becoming inflated.

Also, at the time of removing the main body of the air bag device from the steering wheel, if the operator removes the fixing bolts 106 first by mistake, the ball is still capable of moving. Hence, if an impact is applied to the main body of the air bag device during the operation of removal of the main body, there is again the possibility of the air bag becoming inflated.

SUMMARY OF THE INVENTION

Accordingly, an object of the present invention is to provide an air bag device which is capable of preventing the inflation of an air bag by allowing procedures for the mounting or demounting of a main body of an air bag device to be performed properly in order, thereby overcoming the above-described drawback of the conventional art.

To this end, in accordance with the present invention, there is provided an air bag device comprising restraining means which prohibits the operation of canceling means for canceling the state of prevention of the actuation of an acceleration sensor before the main body of the air bag device is secured to the vehicle by means of mounting means. Since the restraining means is operated after the mounting means is operated, the air bag is prevented from inflating by an acceleration acting before the main body of the air bag device is secured to the vehicle.

In cases where the mounting means and the canceling means are constituted by screws, it is possible to adopt an arrangement in which a stopper is provided as the restraining means in such a manner as to be rotatable relative to the canceling screw, such that the interference between the stopper and the mounting screw disappears only after the mounting screw has been threadingly inserted, thereby allowing the canceling screw to be threadingly inserted.

BRIEF DESCRIPTION OF THE DRAWINGS

FIGS. 1 to 8 illustrate an embodiment of an air bag device in accordance with the present invention, in which

DESCRIPTION OF THE PREFERRED EMBODIMENT

FIGS. 1 to 8 illustrate an embodiment of an air bag device according to the present invention.

Figure 8:
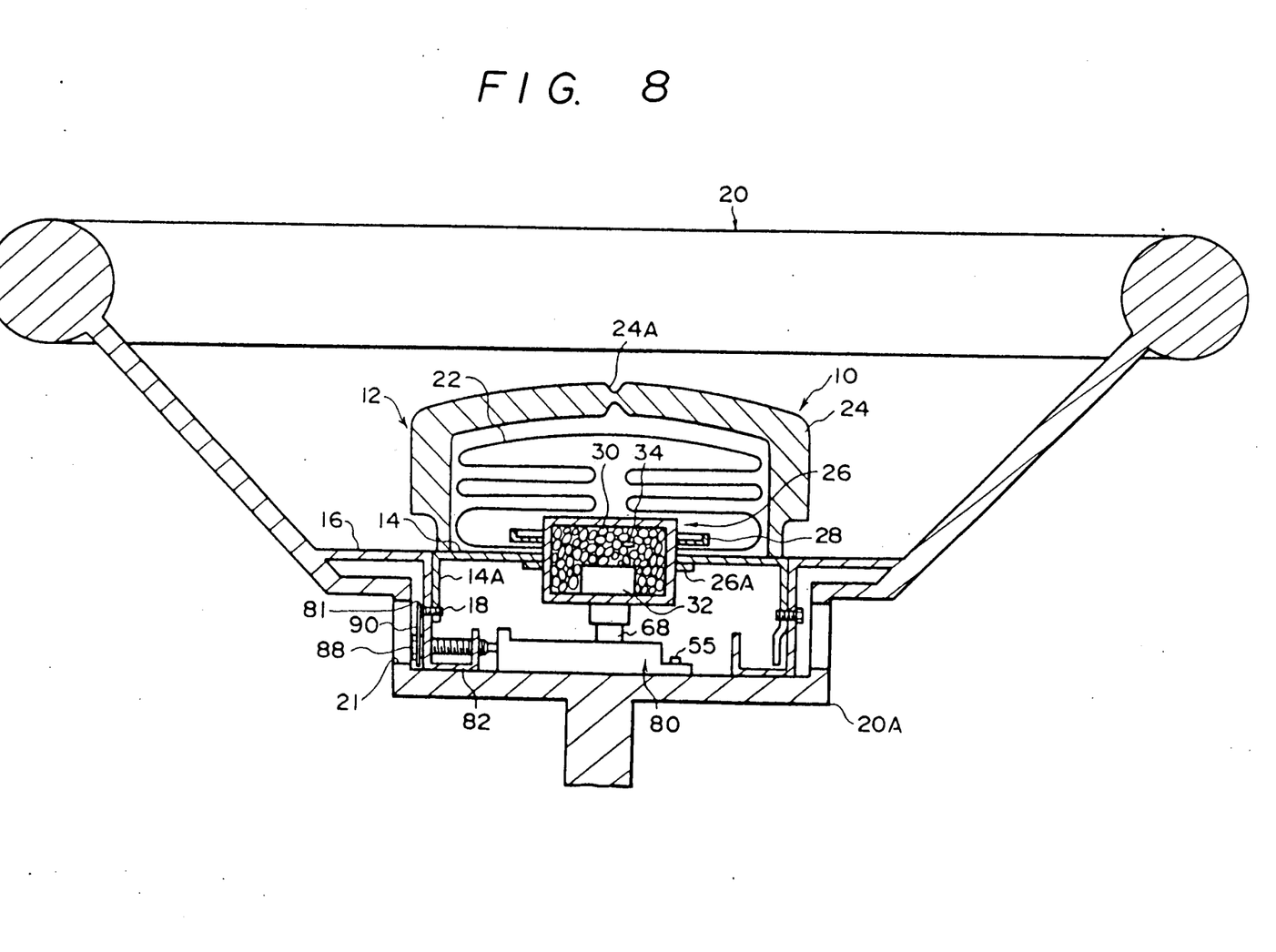
FIG. 8 is a schematic cross-sectional view of the air bag device mounted on a steering wheel.

As shown in FIG. 8, a main body 12 of the air bag device is mounted on a steering wheel 20 via fixing bolts 18 in a state in which a falling portion 14A of a base plate 14 and a bracket 16 formed on the steering wheel correspond to each other.

A notched window portion 21 is formed in a side surface of a hub 20A of the steering wheel 20. This notched window portion 21 is adapted to be closed by a cover (shown in FIG. 2). A pair of bolt holes 18A (FIG. 7) into which the fixing bolts 18 (FIG. 8) are respectively threadingly inserted are formed in the bracket 16 of the steering wheel 20 corresponding to the notched window portion 21. A pair of arcuate covers 81 (see FIG. 1) are provided in such a manner as to project outwardly from opposite side portions of the respective bolt holes 18A.

Figure 7:
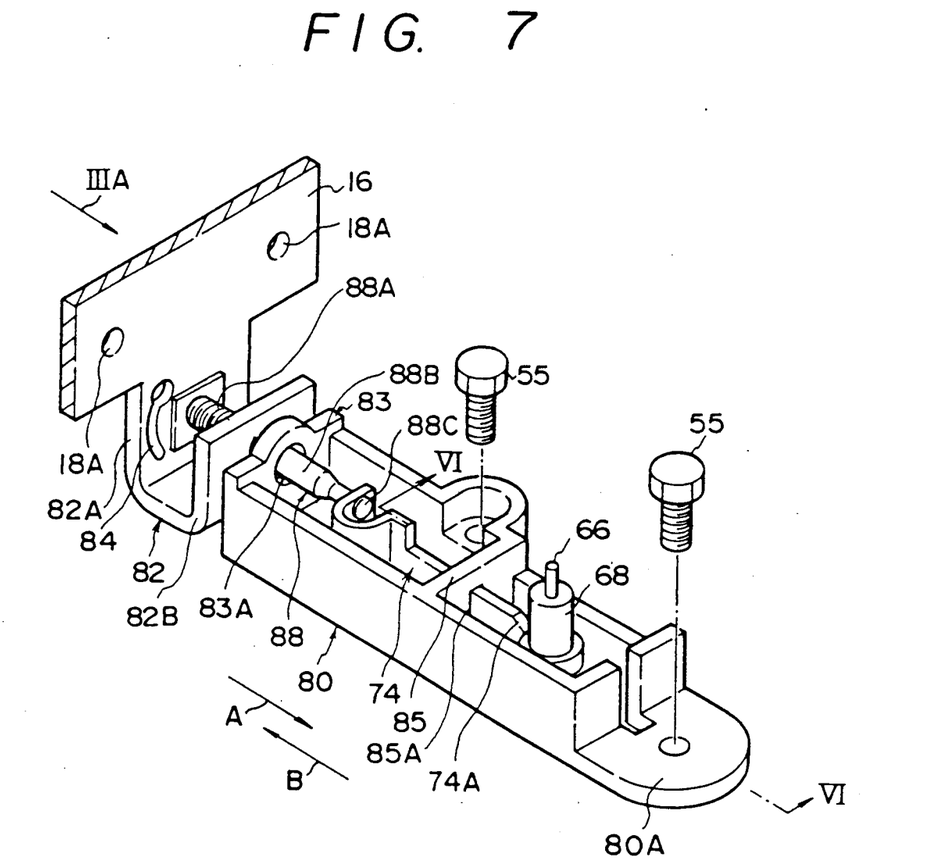
FIG. 7 is an overall perspective view of the base and a slider.

As shown in FIG. 7, a tongue 82 having a substantially U-shaped configuration in terms of its side view is suspended from an intermediate portion of the bracket 16. A notch 84 of a substantially arcuate configuration (see FIG. 3A) is formed in a side plate portion 82A which is the outer side of the tongue 82.

Figure 3A:
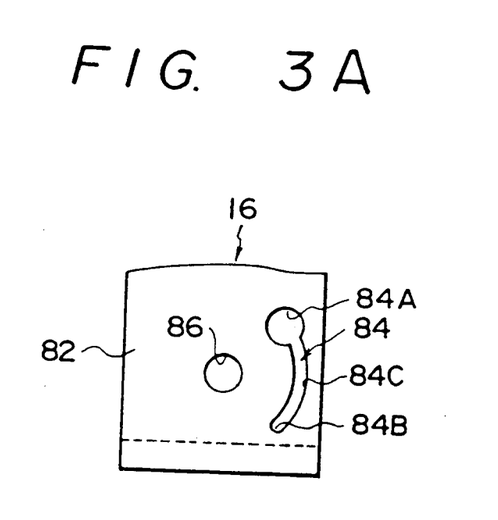
FIG. 3A is a partially enlarged view of a tongue taken in the direction of arrow IIIA of FIG. 1 or 7.

As shown in FIG. 3A, the inside diameter of one end 84A (upper side in FIG. 3A) of the notch 84 is greater than the those of the other end 84B and an intermediate portion 84C. In addition, a bolt hole 86 is formed in the tongue 82 in the vicinity of the notch 84. This bolt hole 86 is provided with an internally threaded portion through which an elongated bolt 88 is inserted (see FIGS. 1 and 7).

An externally threaded portion 88A for threadingly engaging with the bolt hole 86 is formed at a proximal end portion of the elongated bolt 88, while a slider 74 (see FIG. 7) is connected to its distal end. For this reason, if the elongated bolt 88 is threadingly inserted (in the direction of arrow A in FIGS. 6 and 7), an inclined portion 74A of the slider 74 abuts against an inclined portion of a release pin 66, thereby pushing the release pin 66 upward.

Figure 1:
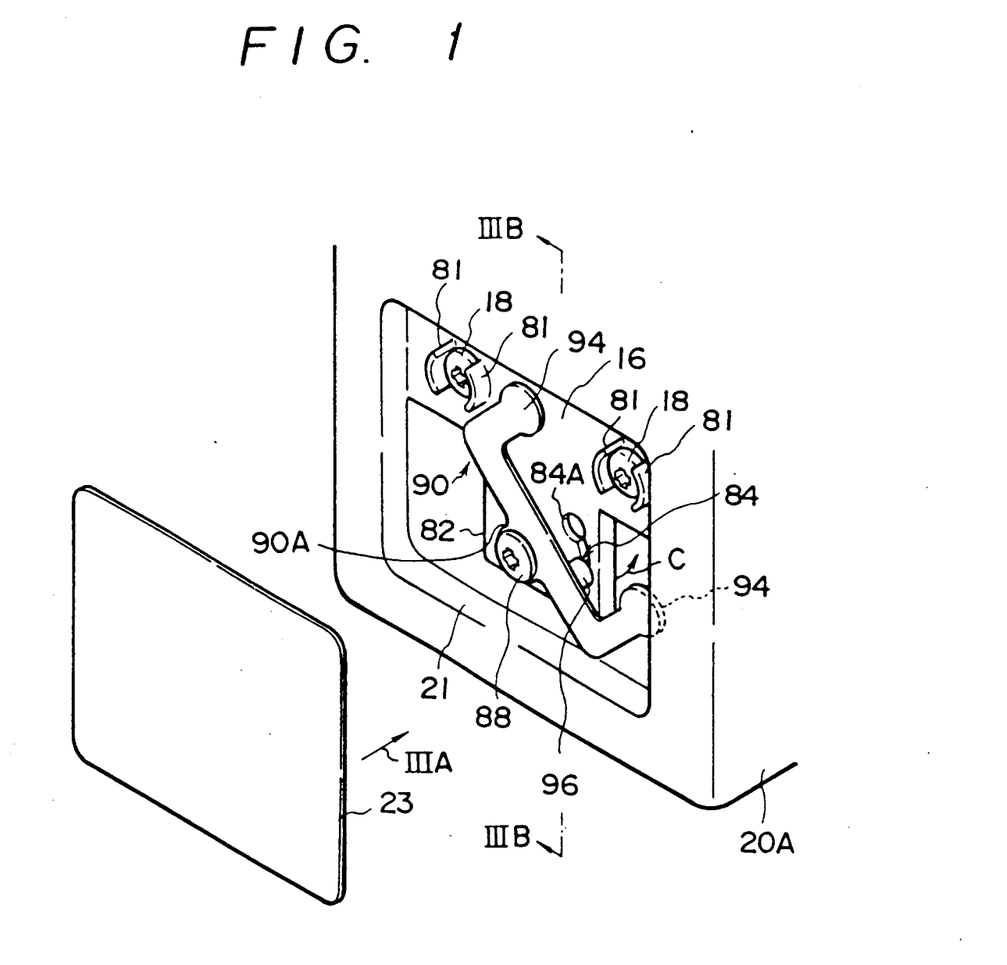
FIG. 1 is a perspective view illustrating a stopper and related parts.

As shown in FIG. 1, a stopper 90 serving as a restraining means is interposed between the elongated bolt 88 and the bracket 16. A substantially semicircular projection 90A is formed in a longitudinally intermediate portion of the stopper 90. The elongated bolt 88 is inserted through the projection 90A. Accordingly, the stopper 90 is rotatably supported to the bracket 16 by means of the elongated bolt 88.

In addition, a cover portion 94 for covering the fixing bolt 18 is formed at each opposite end of the stopper 90.

Figure 3B:
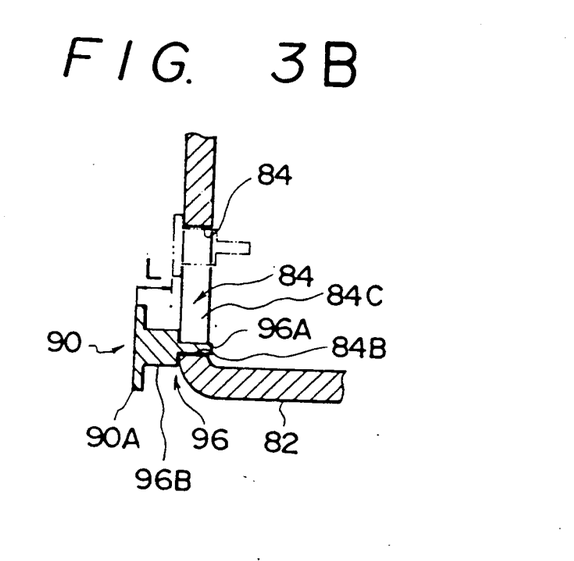
FIG. 3B is a cross-sectional view of the stopper taken along the line IIIB—IIIB of FIG. 1.

As shown in FIG. 3B, a guide pin 96 is formed on an intermediate portion of the stopper 90 in such a manner as to project toward the bracket 16 (FIG. 1).

A distal end portion 96A of this guide pin 96 is provided with a small diameter, while its proximal end portion 96B is provided with a large diameter. The diameter of the proximal end portion 96B is larger than the inside diameters of the end 84B and intermediate portion 84C of the notch 84, and is slightly smaller than the inside diameter of the end 84A thereof. Accordingly, although the distal end portion 96A of the guide pin 96 is always inserted in the notch 84, the proximal end portion 96B can be inserted in the notch 84 only when it is located in the end 84A of the notch 84.

For this reason, when the guide 96 is located at the end 84B of the notch 84 (see FIG. 1), the stopper 90 is raised from the bracket 16 by a stroke L shown in FIG. 3B, such that the slider 74 is moved by the stroke L in the direction of arrow B (see FIG. 6) by means of the elongated bolt 88.

As shown in FIG. 8, the base plate 14 is provided with an air bag 22, an air bag cover 24, and an inflator 26.

The air bag 22 is disposed on the occupant side (upper side in FIG. 8) of the base plate 14 in a folded state. An opening-side edge of the air bag 22 is fixed to a substantially central portion of the base plate 14 via a ring plate 28. The ring plate 28 is tightened to the base plate 14 by means of unillustrated bolts, pressing the opening-side edge of the air bag 22 against the base plate 14.

The air bag cover 24 is disposed on the occupant side (upper side in FIG. 8) of the base plate 14 and accommodates the air bag 22 between the same and the base plate 14. The air bag cover 24 has a frame-like core embedded in its periphery and is fixed to the base plate 14 by means of rivets or the like via the core. A thin-walled portion 24A is formed at a portion of the air bag cover 24 opposing the base plate 14, with the result that the air bag cover 24 is easily broken at this portion.

The inflator 26, which has a cylindrical configuration, is disposed by being passed through a substantially central portion of the base plate 14 with its upper half portion inserted in the air bag 22. The inflator 26 has flanges 26A formed on its outer periphery, and is secured to the surface of the base plate 14 (lower side in FIG. 8) on the side which is remote from the occupant by means of unillustrated bolts.

As shown in FIG. 8, a gas producing substance 30 is sealed in the inflator 26, and an actuator 32 for combusting the gas producing substance 30 is incorporated therein.

The gas producing substance 30 is decomposed by combustion and emits a large amount of gas. The air bag 22 is inflated by this gas. A detonator 34 (see FIG. 5) is provided in the vicinity of the actuator 32 around the gas producing substance 30. The arrangement is such that when the detonator 34 has exploded, an unillustrated igniting agent is ignited to burn the gas producing substance 30.

Figure 5:
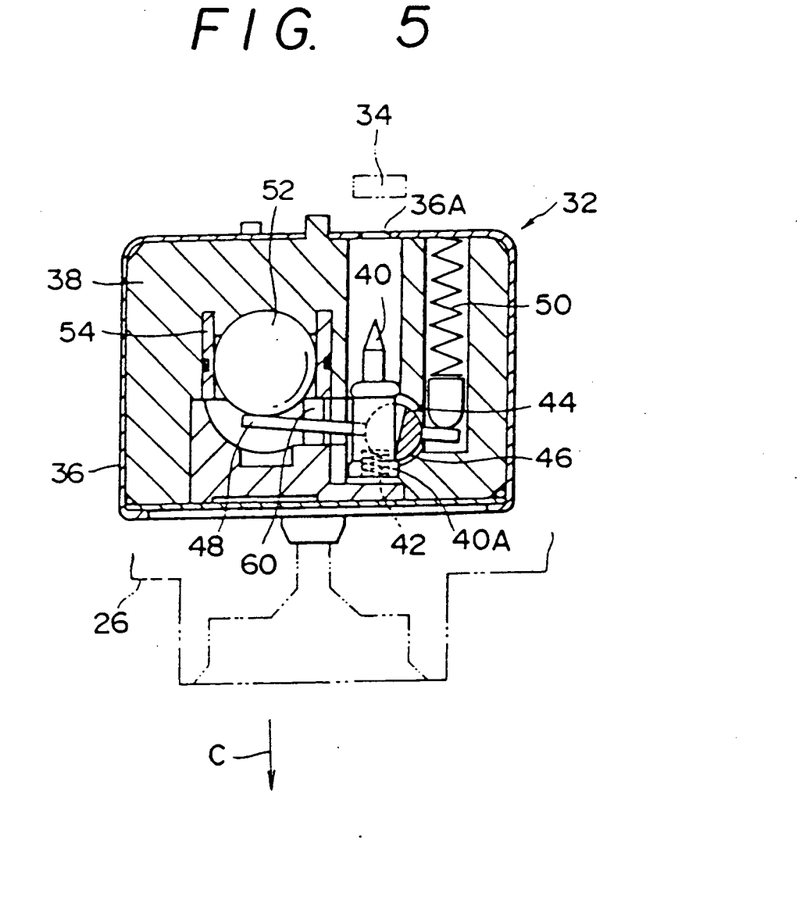
FIG. 5 is a cross-sectional view taken along the line V—V of FIG. 4.

As shown in FIG. 5, the actuator 32 is arranged such that a block 38 is secured in a housing 36, and an ignition pin 40 is provided by being supported by the block 38.

The ignition pin 40 is supported movably in the axial direction (vertically in FIG. 5). As it moves axially, its tip passes through a hole 36A provided in the housing 36 and collides against the detonator 34, thereby exploding the detonator 34.

A collar portion 40A is formed on the ignition pin 40. A drive shaft 44 is retained by the collar portion 40A and is held in a state of non-contact with the detonator 34 against the urging force of a compression coil spring 42.

The drive shaft 44 is disposed in a direction perpendicular to the ignition pin 40, and its intermediate portion is notched so as to form a substantially semicircular cross section. An arcuate portion 46 of the notched portion is retained by the collar portion 40A of the ignition pin 40. The drive shaft 44 is rotatably supported by the block 38, and as the drive shaft 44 rotates, the arcuate portion 46 is disengaged form the collar portion 40A of the ignition pin 40, thereby causing the ignition pin 40 to collide against the detonator 34 by means of the urging force of the compression coil spring 42.

Two levers 48 are secured integrally to an intermediate portion of the drive shaft 44 (see FIG. 5). A compression coil spring 50 abuts against one end of each lever 48, while a ball 52 serving as an inertial member abuts against the other end thereof.

Each of the balls 52 is accommodated in a cylinder 54 which is supported by the block 38. The arrangement is such that each of the balls 52 moves the lever 48 against the urging force of the compression coil spring 50 by means of inertial force when the vehicle speed suddenly decelerates.

Figure 4:
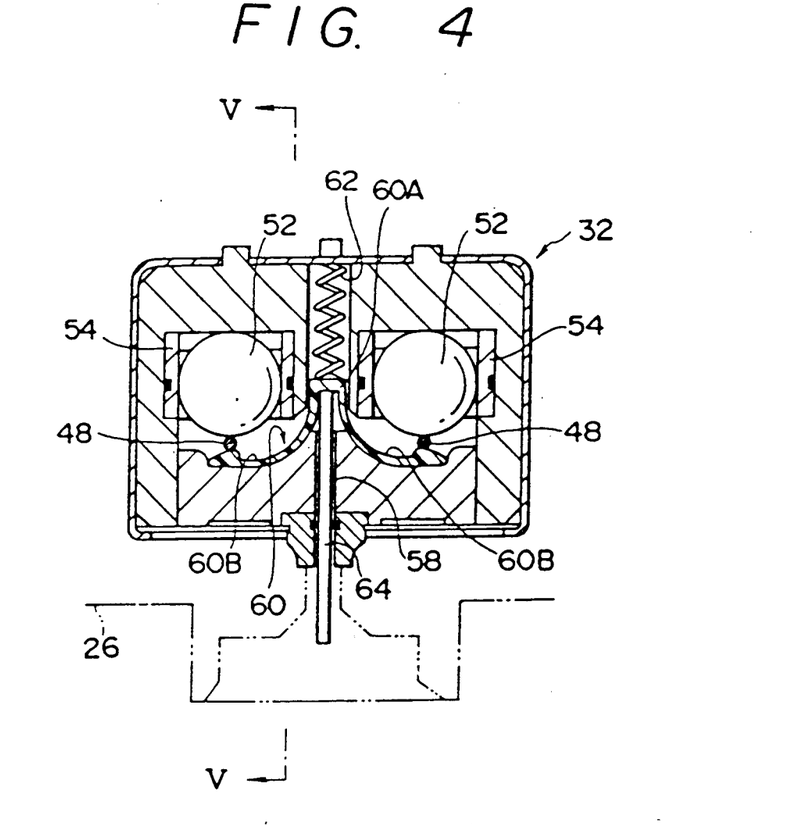
FIG. 4 is a cross-sectional view of an actuator.

As also shown in FIG. 4, a lock bar 60 serving as a means for preventing the movement of the inertial members is supported by the block 38 around the levers 48 in such a manner as to be movable in the axial direction (vertically in FIG. 4). The lock bar 60 has a configuration in which a pair of flexible pieces 60B bifurcate from a base portion 60A. As the lock bar 60 moves in the axial direction, the flexible pieces 60B are capable of advancing into or retracting from the swinging paths of the levers 48. Accordingly, the flexible pieces 60B advance into the swinging paths of the levers 48, thereby making it impossible for the levers 48 to swing.

As for the lock bar 60, its flexible pieces 60B are urged by a compression coil spring 62 in the direction (downward in FIG. 4) in which the flexible pieces 60 advance into the swinging paths of the levers 48. At the same time, a lock shaft 64 is connected to the lock bar 60 so that the flexible pieces 60B move out of the swinging paths of the levers 48 against the urging force of the compression coil spring 62 via the lock shaft 64.

The lock shaft 64 is supported in a pin insertion hole 58 formed in both the block 38 and the inflator 26. The arrangement is such that as the lock shaft 64, when moved in the axial direction, presses the lock bar 60 so as to allow the flexible pieces 60B of the lock bar 60 to move away from the swinging paths of the levers 48.

Figure 6:
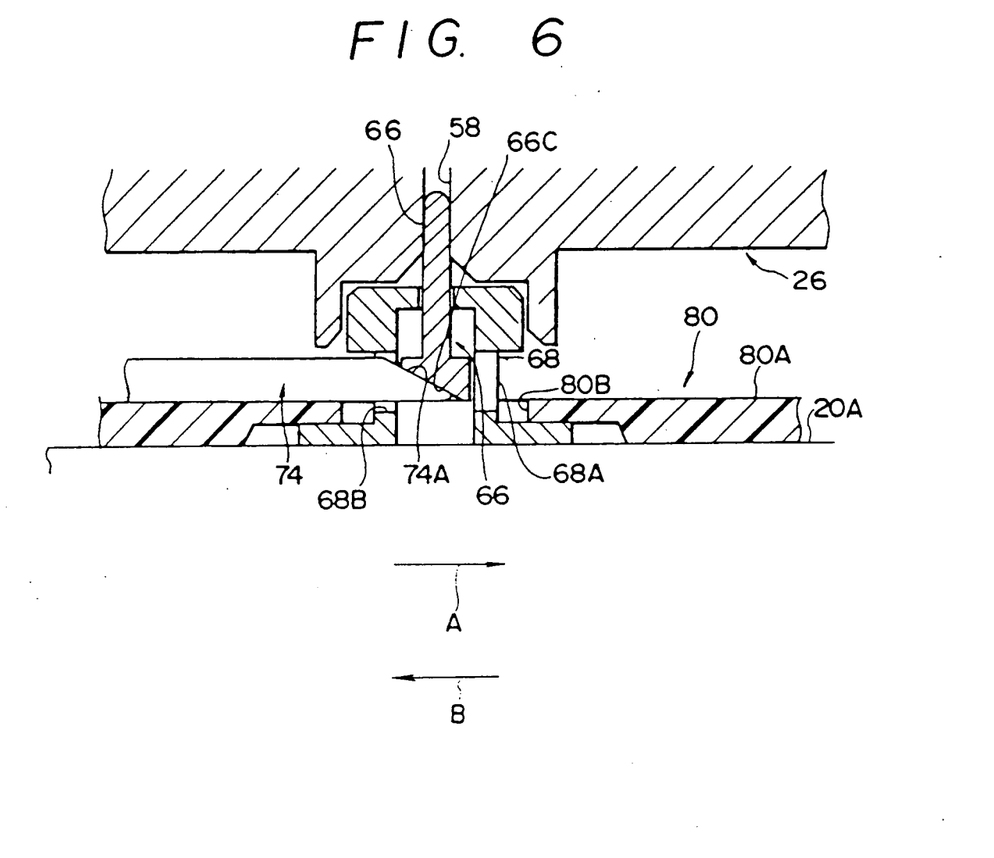
FIG. 6 is a cross-sectional view taken along the line VI—VI of FIG. 7, illustrating portions of a base, a holder, and a release pin.

As shown in FIG. 6, the release pin 66 serving as the cancellation member is supported in such a manner as to be vertically movable inside a holder 68.

The holder 68 is supported by a base 80 secured to the hub 20A of the steering wheel 20 by means of bolts 55. An opening 68B is formed in an intermediate portion of the holder 68 in a direction perpendicular to the axial direction. A tip of the slider 74 serving as the means for preventing the movement of the inertial members is inserted into it.

In addition, an inclined portion 66C is formed at a proximal end of the release pin 66, and corresponds to the inclined portion 74A of the slider 74, so that the release pin 66 is pushed upward when the slider 74 moves rightwardly as viewed in FIG. 6. Here, in a state in which a proximal end portion 96B of the guide pin 96 is inserted in the notch 84, as shown in FIG. 3(B), the release pin 66 causes the flexible pieces 60B of the lock bar 60 to be situated in the moving paths of the levers 48 by means of the urging force of the compression coil spring 62, as shown in FIG. 4, thereby preventing the movement of the balls 52. However, if the elongated bolt 88 is threadingly inserted until the proximal end portion 96B of the guide pin 96 enters the notch 84, the release pin 66 moves upwardly as viewed in FIG. 6 and causes the flexible pieces 60B of the lock bar 60 to move out of the moving paths of the levers 48.

The aforementioned base 80 (see FIG. 6) is formed of a resin, and an insertion hole 80B is provided in a tabular portion 80A of the base 80, a tubular portion 68A of the holder 68 being inserted in it with leeway.

As shown in FIG. 7, partition walls 83, 85 are formed integrally on the tabular portion 80A of the base 80. A slider insertion hole 85A for the insertion of the slider 74 therethrough is formed in the partition wall 85, while an elongated pin insertion hole 83A for the insertion of the elongated pin 88 therethrough is formed in the partition wall 83.

A description will now be given of the operation of this embodiment.

When installing the air bag device 10 on the steering wheel 20, the base plate 14 of the main body 12 of the air bag device 10 and the bracket 16 of the steering wheel 20 are secured together by means of the fixing bolts 18. Then, the elongated bolt 88 is threadingly inserted so as to set the inertial members in a movable state.

In this case, even if the operator tries to threadingly insert the elongated bolt 88 by mistake before securing the fixing bolts 18, the distal end portion 96A of the guide pin 96 of the stopper 90 pivotally supported by the elongated bolt 88 is situated at the end 84B of the notch 84. Consequently, even if the elongated bolt 88 is threadingly inserted, the proximal end portion 96B of the guide pin 96 of the stopper 90 cannot enter the notch 84.

For this reason, since the elongated bolt 88 cannot be threadingly inserted fully, the slider 74 is not brought into contact with the release pin 66, and the release pin 66 is not pushed upward. Hence, since the lock bar 60 does not move either, the balls 52 still maintain a state in which their movement is prevented by the lock bar 60.

At the time when the main body 12 of the air bag device is secured to the steering wheel 20 by threadingly inserting the fixing bolts 18, even if an impact is applied to the main body 12 of the air bag device, the air bag 22 is not inflated.

Figure 2:
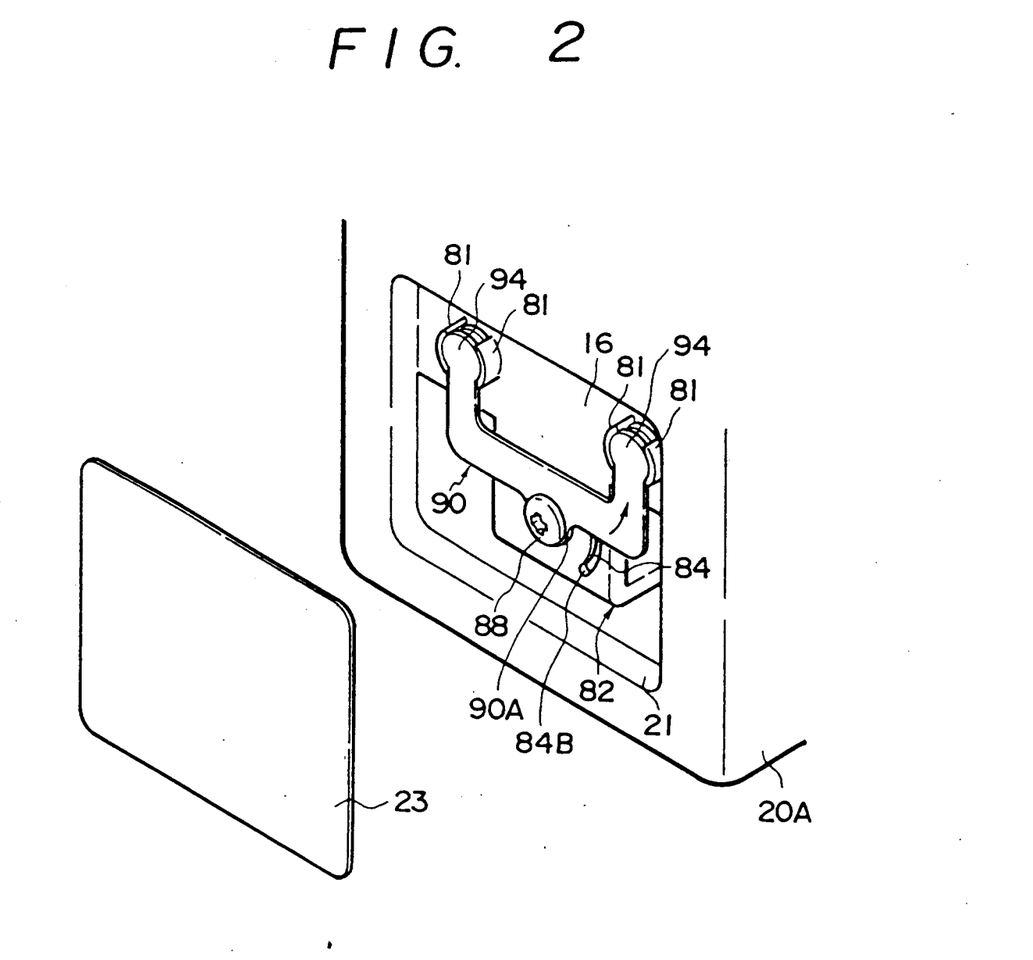
FIG. 2 is a diagram illustrating a state of installation of the stopper.

Moreover, even if the operator then tightens the fixing bolts 18 and rotates the stopper 90 counterclockwise as viewed in FIG. 2 (in the direction of arrow C in FIG. 1) so as to fit the cover 23, the cover 23 is brought into contact with the elongated bolt 88 and therefore cannot be fitted in the notched window portion 21. Hence, the operator becomes aware that the elongated bolt 88 needs to be inserted.

If the fixing bolts 18 are threadingly inserted completely, and the stopper 90 is rotated counterclockwise as shown in FIG. 2, the proximal end 96B of the guide pin 96 corresponds to the end 84A of the notch 84, so that the elongated bolt 88 can be threadingly inserted. After the elongated bolt has been threadingly inserted, the cover portions 94 are respectively fitted between the arcuate covers 81, and the proximal end portion 96B enters the end 84A, so that the cover 23 can be fitted.

Accordingly, it is possible to prevent in advance a situation in which the operation of mounting the main body 12 of the air bag device is completed in a state in which the release pin 66 has not been pushed upward.

In addition, when removing the main body 12 of the air bag device from the steering wheel, the stopper 90 is disposed in the state shown in FIG. 2. Accordingly, the operator will realize that he has to unloosen the elongated bolt 88 first. For this reason, if the elongated bolt 88 is loosened, the proximal end 96B of the guide pin 96 is withdrawn from the end 84A of the notch 84, allowing the slider 74 to move in the direction of withdrawal (in the direction of arrow B in FIG. 6), so that the abutment between the release pin 66 and the slider 74 is canceled. As a result, the lock bar 60 prevents the movement of the balls 52 again.

Accordingly, the air bag 22 is prevented from becoming inflated even if an impact is applied to the main body 12 of the air bag while, after rotating the stopper 90 clockwise as viewed in FIG. 2 )in the opposite direction to that of the arrow in FIG. 2) so as to expose the fixing bolts 18, the main body 12 of the air bag device is being removed from the steering wheel 20 by loosening the fixing bolts 18.

As described above, the air bag device in accordance with the present invention offers an advantage in that the inflation of the air bag can be prevented during the mounting and demounting of the main body of the air bag device since the procedures of mounting and demounting the main body of the air bag device cannot be mistaken.

What is claimed is:

1. An air bag device mounted on a vehicle and having a bag adapted to be inflated in front of an occupant of a vehicle upon actuation of an acceleration sensor, said air bag device comprising:
   a main body having said bag and said acceleration sensor;
   mounting means for mounting said main body onto the vehicle;
   preventing means for preventing the actuation of said acceleration sensor;

prevention canceling means for canceling the preventing action of said preventing means and adapted to be operated during assembly; and restraining means for rendering said prevention canceling means operable after said main body is mounted on said vehicle by said mounting means, whereby the operation of said acceleration sensor is prevented by an impact applied to said air bag body during the mounting of said air bag body onto said vehicle.

2. An air bag device according to claim 1, wherein said prevention canceling means has a canceling screw which is threadingly inserted into said main body by an operation, and said restraining means prevents said screw from being threadingly inserted before said main body is mounted onto said vehicle by said mounting means.

3. An air bag device according to claim 2, wherein said canceling screw is inserted through said restraining means, and said restraining means is swingable about said screw.

4. An air bag device according to claim 3, wherein said restraining means permits the threading insertion only at a predetermined swinging positioned.

5. An air bag device according to claim 4, wherein said restraining means prevents said screw from being threadingly inserted, by being engaged with an enlarged-head portion of said screw.

6. An air bag device according to claim 5, wherein said restraining means is opposed to a head of a fixing screw of said mounting means at said predetermined swinging position, and said fixing screw prevents the movement of said restraining means so as to render impossible the threading insertion of said canceling screw of said prevention canceling means before said main body is secured to said vehicle by threadingly inserting said fixing screw.

7. An air device according to claim 6, wherein said restraining means covers said head of said fixing screw in a state in which said canceling screw of said prevention canceling means is threadingly inserted, said restraining means rendering impossible the operation of removing said fixing screw before said canceling screw of said prevention canceling means is loosened.

8. An air bag device according to claim 4, wherein said restraining means is provided with a shaft portion which is movable in an axial direction of said canceling screw only at said predetermined swinging position.

9. An air bag device according to claim 8, wherein a hole into which said shaft portion is inserted is formed in said main body.

10. An air bag device according to claim 7, wherein a cover is disposed in correspondence with a periphery of said fixing screw of said mounting means into which cover said restraining means is fitted with said canceling screw of said prevention canceling means threadingly inserted therein and which cover is adapted to prevent said swinging of said restraining means.

11. An air bag device for a vehicle, comprising:

an main body incorporating a bag and means for inflating said bag;

mounting means for securing said main body onto the vehicle;

a canceling screw which can be threadingly inserted in parallel with said mounting means, said canceling screw, when threadingly inserted, being capable of operating said inflating means inside said main body at a predetermined acceleration; and restraining means which is rotatable about said canceling screw and is movable in it axial direction after said main body is secured to said chassis by said mounting means, thereby allowing said canceling screw to be threadingly inserted.

12. An air bag device according to claim 11, wherein said restraining means has a plurality of cover portions respectively corresponding to a plurality of fixing screws of said mounting means.

13. An air bag device according to claim 11, wherein said restraining means is a tabular member through which said canceling screw is inserted.

14. An air bag device according to claim 13, wherein said tabular restraining means is brought into contact with a large-diameter head of said canceling screw so as to prevent the axial movement of said canceling screw.

15. An air bag device according to claim 11, wherein a pin projecting from said restraining means corresponds to a notch formed in said main body, whereby said restraining means allows the threading insertion of said canceling screw only at a predetermined rotational angle.

16. An air bag device according to claim 15, wherein said cover portions formed on said restraining means cover said mounting means at said predetermined rotational angle.

17. An air bag device according to claim 11, wherein said mounting means is provided with fixing screw, and when said main body is secured to said vehicle by the threading insertion of said fixing screw, said restraining means is rendered movable in an axial direction of said canceling screw, thereby making it possible to threadingly insert said canceling screw.

18. An air bag device in which an acceleration sensor is provided in an main body, a gas is supplied to a bag upon actuation of said acceleration sensor so as to inflate said bag in front of a driver of a vehicle, said air bag device comprising:

preventing means disposed in said air bag body and adapted to prevent the operation of said main body even if an acceleration has occurred;

a fixing screw for fixing said main body onto a steering wheel of said vehicle;

a canceling screw which is supported by said main body coaxially with said fixing screw and is adapted to cancel the actuation of said preventing means by being threadingly inserted so as to render said bag inflatable by the action of an acceleration; and a stopper which is rotatable about an axis of said canceling screw, but abuts against an enlarged-diameter portion of said canceling screw, and prevents the threading insertion of said canceling screw as said stopper abuts against a head of said fixing screw before the threading insertion of said fixing screw.

19. An air bag device according to claim 18, wherein said stopper is provided with a pin which makes said stopper movable about said axis of said canceling screw in an axial direction of said canceling screw only at a predetermined position.

20. An air bag device according to claim 18, wherein a portion of said stopper which abuts against said fixing screw has a sufficient size for covering said head of said fixing screw.

* * * * *